(12) United States Patent
Duhon et al.

(10) Patent No.: US 10,252,196 B2
(45) Date of Patent: Apr. 9, 2019

(54) ASSEMBLY AND METHOD FOR FILTERING FLUIDS

(71) Applicant: Advanced Tool & Supply, LLC, Broussard, LA (US)

(72) Inventors: Bryan Duhon, Church Point, LA (US); Shannon Duhon, Broussard, LA (US); Shawn Gallow, Ville Platte, LA (US); Yury Remedio, Lafayette, LA (US)

(73) Assignee: Advanced Tool and Supply, LLC, Broussard, LA (US)

( * ) Notice: Subject to any disclaimer, the term of this patent is extended or adjusted under 35 U.S.C. 154(b) by 290 days.

(21) Appl. No.: 15/341,435

(22) Filed: Nov. 2, 2016

(65) Prior Publication Data
US 2017/0080364 A1     Mar. 23, 2017

Related U.S. Application Data

(63) Continuation-in-part of application No. 15/224,916, filed on Aug. 1, 2016.

(60) Provisional application No. 62/200,150, filed on Aug. 3, 2015.

(51) Int. Cl.
| | |
|---|---|
| *B01D 29/96* | (2006.01) |
| *B01D 35/30* | (2006.01) |
| *B01D 35/147* | (2006.01) |
| *B01D 43/00* | (2006.01) |

(52) U.S. Cl.
CPC ........... *B01D 35/147* (2013.01); *B01D 29/96* (2013.01); *B01D 35/30* (2013.01); *B01D 2201/24* (2013.01); *B01D 2201/302* (2013.01); *B01D 2201/4053* (2013.01)

(58) Field of Classification Search
CPC ...... E21B 21/103; E21B 43/084; E21B 43/10; E21B 34/06; E21B 43/082; E21B 43/088; E21B 43/08; B01D 2239/10; B01D 35/02; B01D 29/012; B01D 29/96; B01D 39/10; B01D 43/00; B01D 46/0024
See application file for complete search history.

(56) References Cited

U.S. PATENT DOCUMENTS

| | | | | |
|---|---|---|---|---|
| 1,407,763 A | * | 2/1922 | Langston | ............... B01D 27/06 210/234 |
| 3,615,016 A | * | 10/1971 | Soriente et al. | ..... B01D 29/114 210/232 |
| 3,904,109 A | * | 9/1975 | Underwood | .............. B04B 1/00 494/36 |

(Continued)

*Primary Examiner* — Ana M Fortuna
(74) *Attorney, Agent, or Firm* — Jones Walker LLP

(57) ABSTRACT

A filtering apparatus includes a screen assembly removably positioned within an inner cavity of a screen chamber. The screen assembly includes a frame portion at a first end and a screen portion extending from the frame portion to a second end. The frame portion includes an end block and frame members interconnecting the end block and the screen portion. The screen portion includes an outer screen and an inner screen disposed within an interior space of the outer screen. An outer wall of the outer screen and an outer wall of the inner screen each includes a plurality of openings. The screen chamber includes a removable end cover with a key for rotationally locking the screen assembly in the inner cavity. A screen manifold may include a first fluid path including the screen chamber, and further including a bypass fluid path having a bypass valve.

26 Claims, 14 Drawing Sheets

(56) References Cited

U.S. PATENT DOCUMENTS

| | | | | |
|---|---|---|---|---|
| 5,551,513 | A * | 9/1996 | Surles | B01D 39/2075 |
| | | | | 166/205 |
| 5,642,781 | A * | 7/1997 | Richard | B01D 46/2411 |
| | | | | 166/231 |
| 6,641,730 | B2 | 11/2003 | Poole | |
| 8,251,138 | B2 * | 8/2012 | Bonner | E21B 43/084 |
| | | | | 166/230 |
| 8,336,617 | B2 * | 12/2012 | Knobloch | E21B 37/02 |
| | | | | 166/205 |
| 8,852,175 | B2 * | 10/2014 | Brownell | A61B 3/1005 |
| | | | | 606/4 |
| 2009/0166086 | A1 * | 7/2009 | Sugiura | E21B 7/062 |
| | | | | 175/25 |
| 2010/0065125 | A1 * | 3/2010 | Telfer | E21B 21/103 |
| | | | | 137/1 |
| 2011/0290334 | A1 * | 12/2011 | Hern | E21B 27/005 |
| | | | | 137/15.04 |
| 2012/0292047 | A1 * | 11/2012 | Knobloch, Jr. | E21B 21/12 |
| | | | | 166/378 |
| 2013/0341027 | A1 * | 12/2013 | Xu | E21B 27/005 |
| | | | | 166/301 |
| 2017/0036145 | A1 * | 2/2017 | Duhon | B01D 35/147 |
| 2017/0080364 | A1 * | 3/2017 | Duhon | B01D 35/147 |

* cited by examiner

ASSEMBLY AND METHOD FOR FILTERING FLUIDS

CROSS REFERENCE TO RELATED APPLICATION

This application is a continuation-in-part of U.S. patent application Ser. No. 15/224,916, filed on Aug. 1, 2016, which claims the benefit of and priority to U.S. Provisional Patent Application No. 62/200,150, filed on Aug. 3, 2015, both of which are incorporated herein by reference in their entireties.

DETAILED DESCRIPTION OF THE INVENTION

Figure 1:
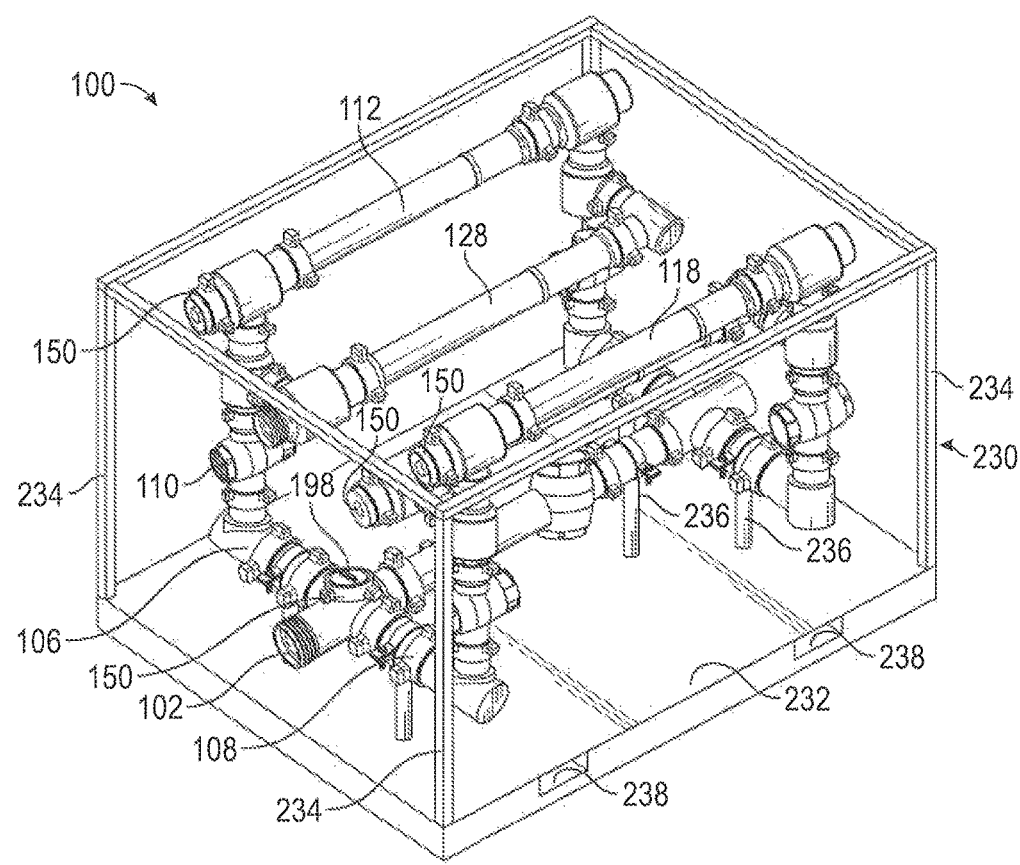
FIG. 1 is a perspective view of a screen manifold.

FIGS. 1-4 illustrate screen manifold 100, which may be used to filter fluids exiting a hydrocarbon well so that such fluids, now free of debris or other contaminants, may be reused downhole. Accordingly, screen manifold 100 is intended to be used at the well surface.

Referring still to FIGS. 1-4, screen manifold 100 may include fluid inlet 102 and fluid outlet 104. Fluid entering fluid inlet 102 and/or exiting fluid outlet 104 may be traveling to or from a hydrocarbon well. First fluid path 106 and second fluid path 108 may each extend from fluid inlet 102 to fluid outlet 104. First fluid path 106 may include first inlet valve 110, first screen chamber 112, and first outlet valve 114. Second fluid path 108 may include second inlet valve 116, second screen chamber 118, and second outlet valve 120. In an alternate embodiment, one or both of first and second fluid paths 106 and 108 may each include no inlet valve or no outlet valve.

First parallel fluid path 122 may extend from inlet 124 to outlet 126. Inlet 124 may connect to first fluid path 106 between first inlet valve 110 and first screen chamber 112. Outlet 126 may connect to first fluid path 106 between first screen chamber 112 and first outlet valve 114. First parallel fluid path 122 includes first parallel screen chamber 128 between inlet 124 and outlet 126. Similarly, second parallel fluid path 130 may extend from inlet 132 to outlet 134. Inlet 132 may connect to second fluid path 108 between second inlet valve 116 and second screen chamber 118. Outlet 134 may connect to second fluid path 108 between second screen chamber 118 and second outlet valve 120. Second parallel fluid path 130 includes second parallel screen chamber 136 between inlet 132 and outlet 134.

Figure 2:
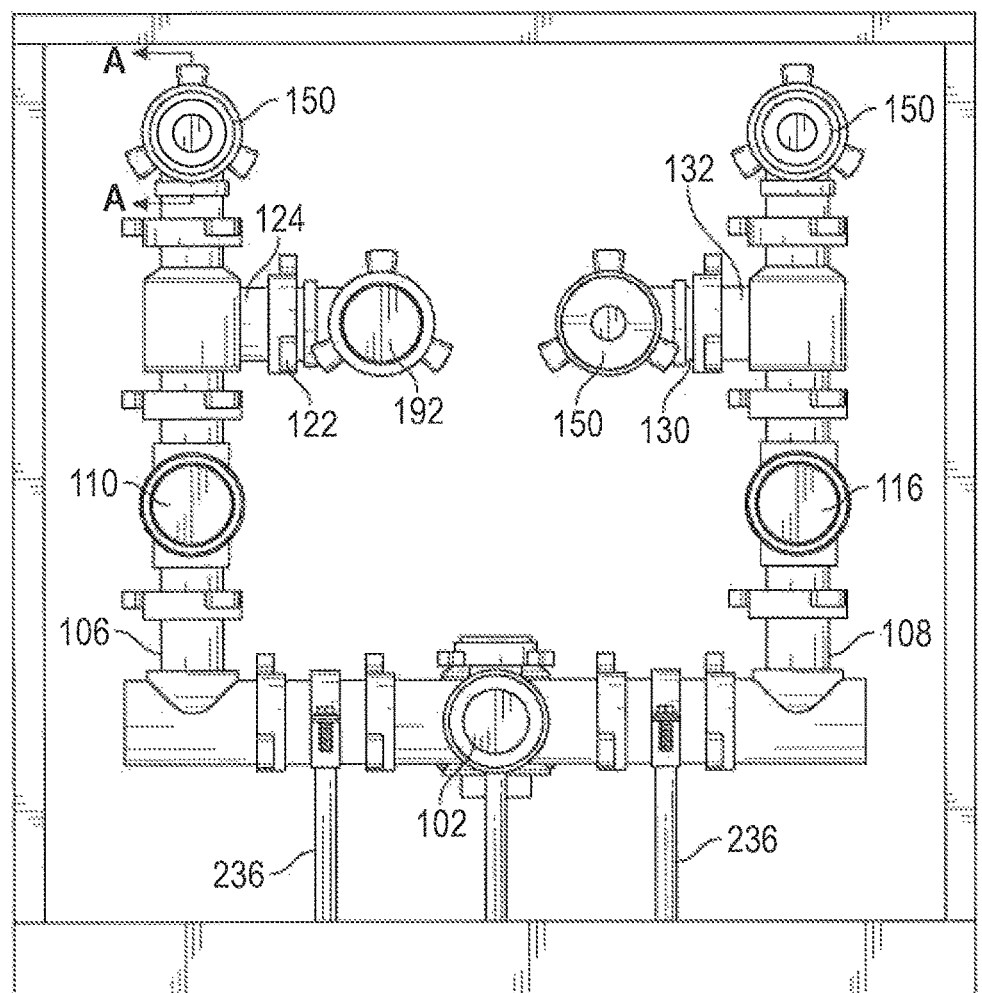
FIG. 2 is a front view of the screen manifold.
Figure 3:
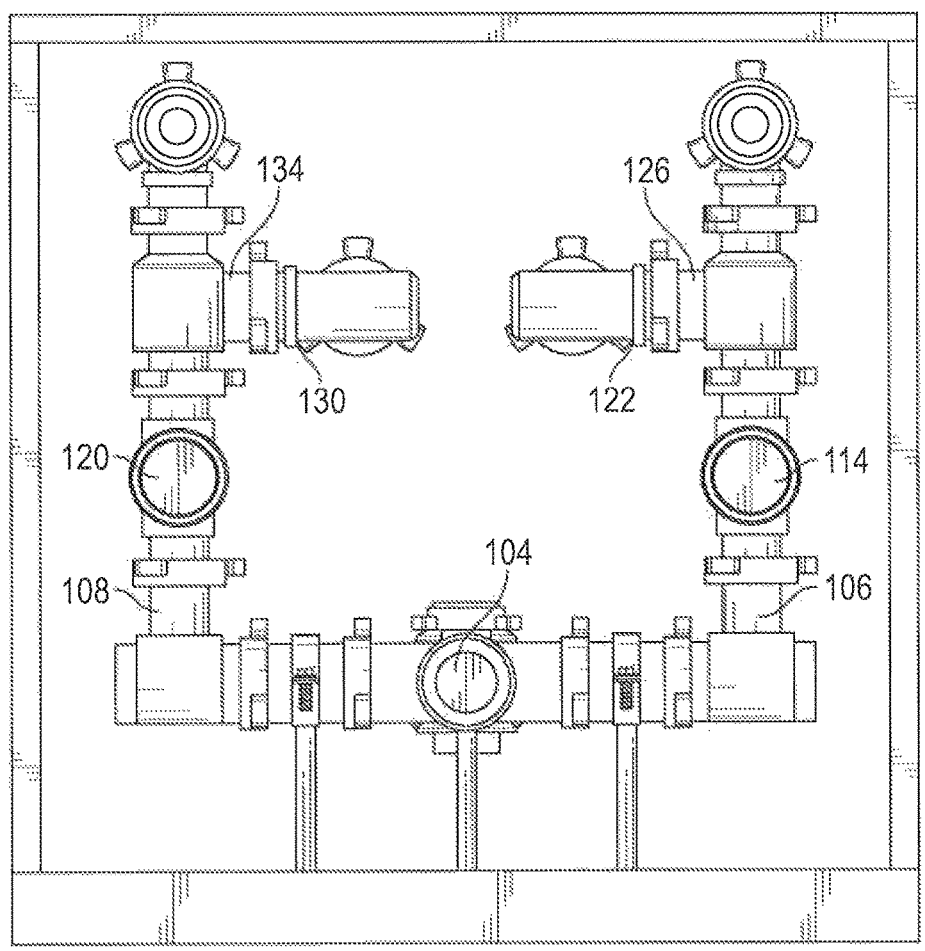
FIG. 3 is a rear view of the screen manifold.
Figure 4:
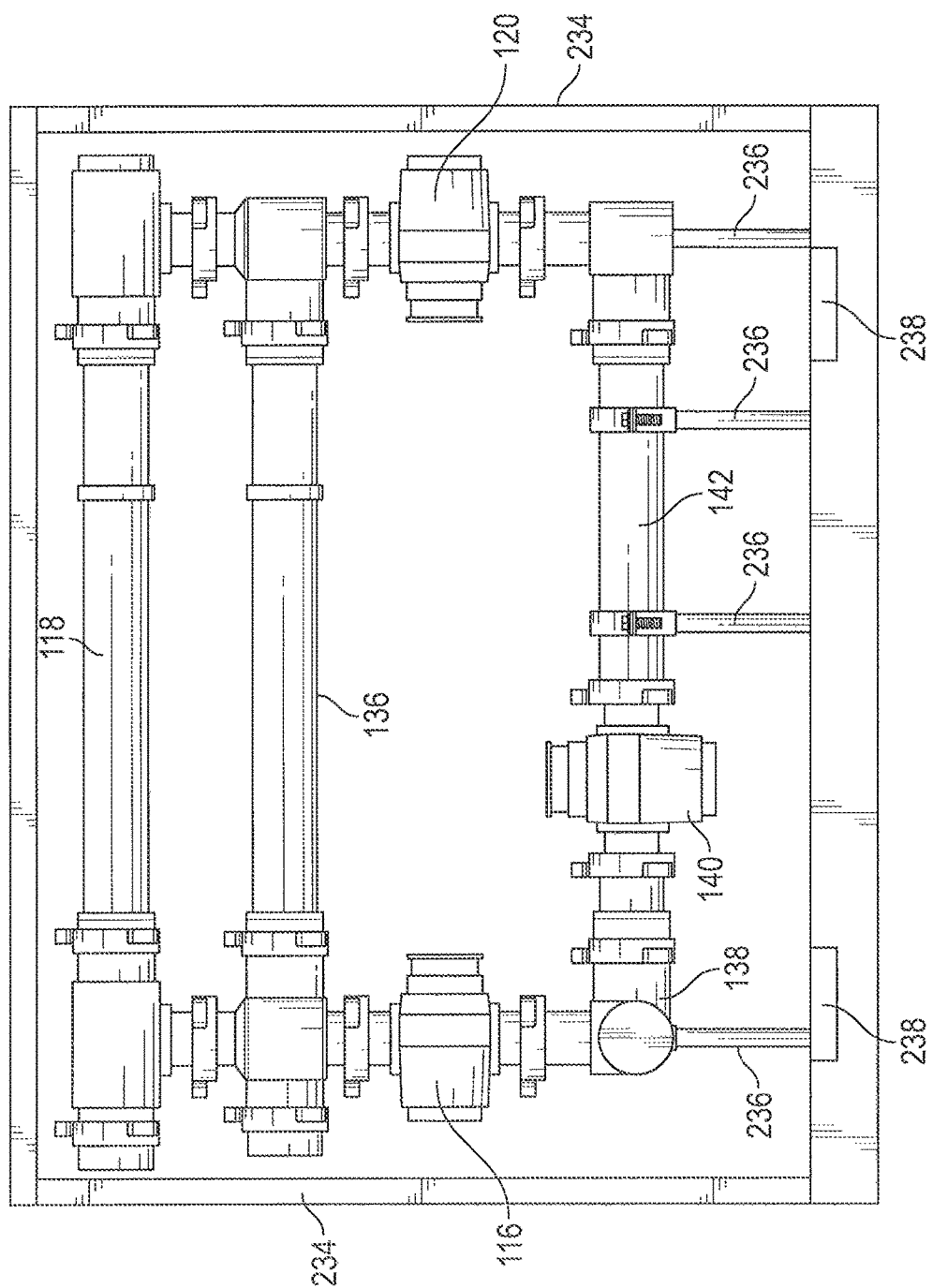
FIG. 4 is a side view of the screen manifold.

Each of screen chambers 112, 128, 118, and 136 may have a corresponding removable end cover 150 (also referred to as removable screen chamber cover). A screen may be removably positioned within each of screen chambers 112, 128, 118, and 136 for filtering a fluid flowing through first fluid path 106 and second fluid path 108. Removal of screen chamber cover 150 from any of the screen chambers allows for installation, inspection, or removal of the screen. FIGS. 1 and 2 illustrate removable end cover 150 of first parallel screen chamber 128 separated from screen chamber 128; instead, it is resting near fluid inlet 102.

Screen manifold 100 may also include bypass fluid path 138 extending from fluid inlet 102 to fluid outlet 104. Bypass fluid path 138 may include bypass valve 140 and bypass conduit 142.

Figure 5:
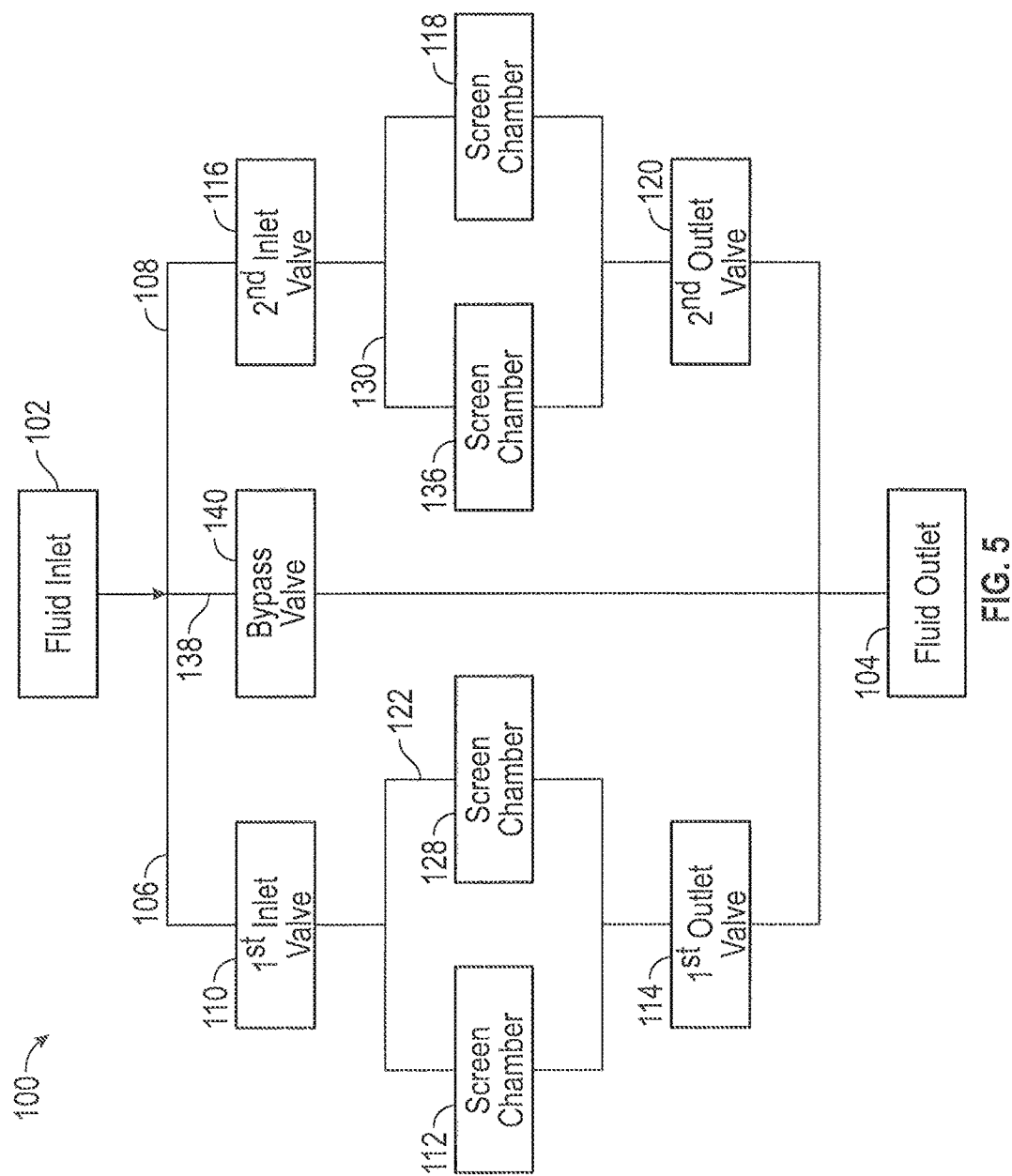
FIG. 5 is a schematic diagram of fluid paths through the screen manifold.
Figure 6:
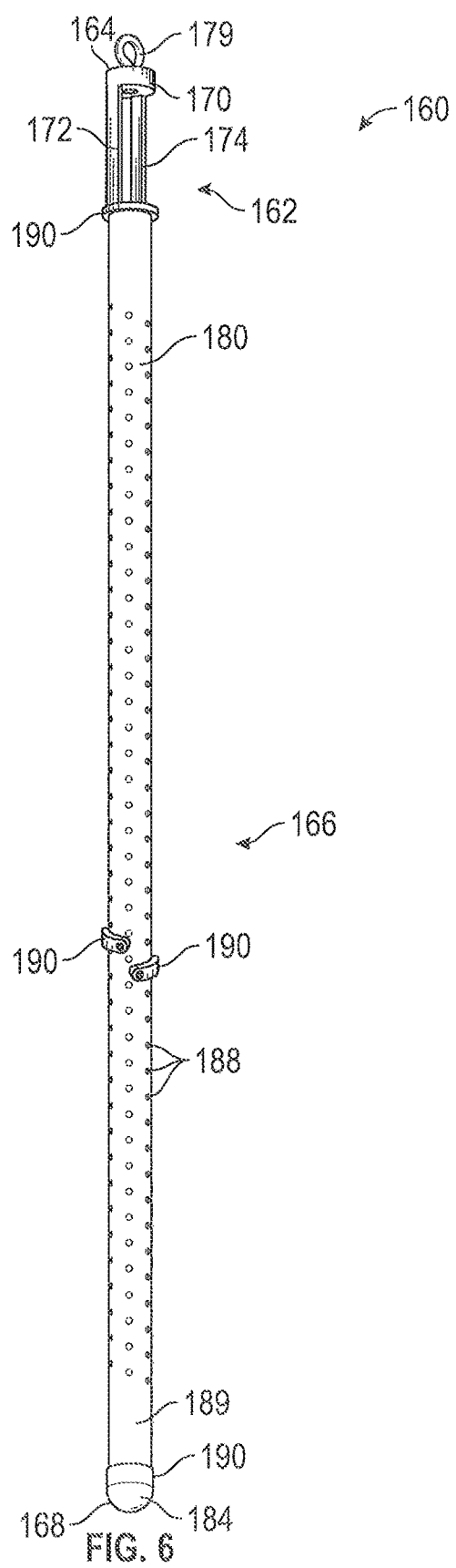
FIG. 6 is a side view of a screen of the screen manifold.
Figure 7:
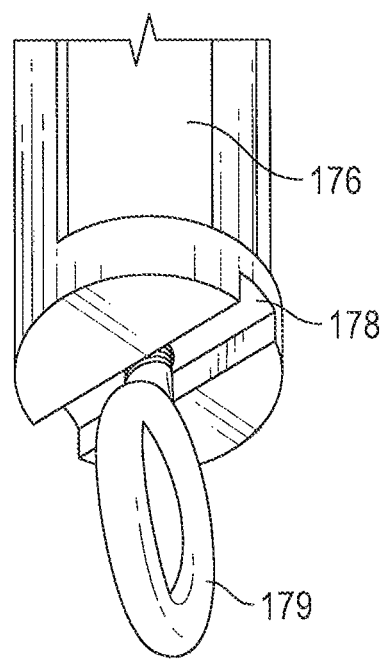
FIG. 7 is a partial perspective view of the screen shown in FIG. 6.
Figure 8:
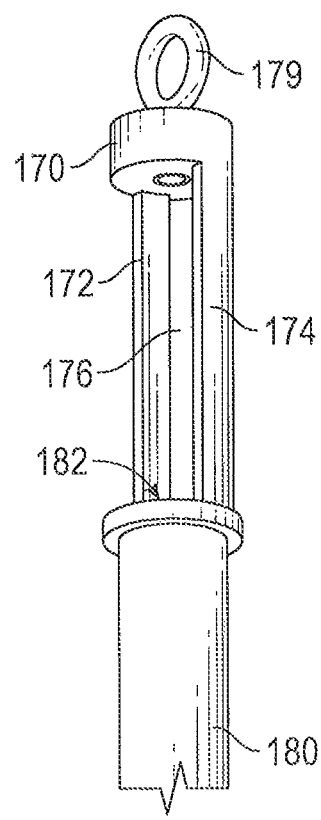
FIG. 8 is another partial perspective view of the screen shown in FIG. 6

FIG. 5 schematically illustrates first fluid path 106, second fluid path 108, and bypass fluid path 138 of screen manifold 100. First inlet valve 110 controls fluid flow from fluid inlet 102 to first screen chamber 112 and first parallel screen chamber 128. First outlet valve 114 controls fluid flow from first screen chamber 112 and first parallel screen chamber 128 to fluid outlet 104. Second inlet valve 116 controls fluid flow from fluid inlet 102 to second screen chamber 118 and second parallel screen chamber 136. Second outlet valve 120 controls fluid flow from second screen chamber 118 and second parallel screen chamber 136 to fluid outlet 104. In other embodiments, screen manifold 100 may include additional valves to further control fluid flow to the individual screen chambers 112, 128, 118, 136. In an alternative embodiment, three or more screen chambers may be in fluid communication with fluid inlet 102 and/or two or more inlet valves. Bypass valve 140 controls fluid flow through bypass conduit 142.

Screen manifold 100 may have a default position in which a fluid flowing through fluid inlet 102 is filtered by screens positioned within one or more screen chambers 112, 128, 118, and 136. For example, in the default position, inlet valves 110, 116 and outlet valves 114, 120 may be open, and bypass valve 140 is closed. Accordingly, fluid inlet 102 may be in fluid communication with screen chambers 112, 128, 118, and 136. In other embodiments, one or more of inlet valves 110, 116 and/or outlet valves 114, 120 may be closed in the default position to allow fluid flow to selected screen chambers.

Screen manifold 100 may also have a bypass position to allow continued fluid flow through screen manifold 100 during inspection, maintenance, or replacement of screens within screen chambers 112, 128, 118, and 136. In the bypass position, bypass valve 140 is open and inlet valves 110, 116 and/or outlet valves 114, 120 are closed. Accordingly, fluid inlet 102 is in fluid communication with fluid outlet 104 through bypass conduit 142. In one embodiment, the bypass position includes closing one or more of inlet valves 110, 116 or one or more of outlet valves 114, 120 to stop fluid flow through corresponding screen chambers 112, 128 and/or 118, 136.

Each screen chamber may include a pressure sensor (not shown) to provide pressure measurements within the screen chambers. For example, pressure sensors may be connected to one or more of screen chamber covers 150. Substantially non-average pressure readings from pressure sensors may indicate that a screen within that screen chamber needs to be serviced or replaced. When the non-average pressure reading is found, screen manifold 100 may be placed in the bypass position to perform the necessary work with the screen.

FIGS. 6-9 illustrate one embodiment of a screen disposed within screen chambers 112, 128, 118, and/or 136 of screen manifold 100. Screen 160 includes frame portion 162 at first end 164 and screen portion 166 extending from frame portion 162 to second end 168. Frame portion 162 may include end block 170 at first end 164 and frame members 172 and 174 extending from end block 170 to screen portion 166. Frame members 172 and 174 may define eye 176 (also referred to as aperture 176). In other embodiments, frame portion 162 of screen 160 may include three or more frame members 172 and 174 that define at least one aperture. End block 170 may include notch 178 configured to cooperate with removable end cover 150 of the screen chamber within which screen 160 is disposed (as explained in more detail below). Removable handle 179 may be detachably secured to end block 170 to facilitate installation of screen 160 into a screen chamber and removal of screen 160 from a screen chamber.

Screen portion 166 of screen 160 may include outer wall 180 extending from inlet 182 to end cap 184. End cap 184 is disposed at second end 168 of screen 160. End cap 184 may be fixed or removably attached to the remainder of screen 160. Outer wall 180 may be formed of a hollow longitudinal member including interior space 186 (shown in FIG. 9). Screen portion 166 may include a plurality of openings 188 through outer wall 180. Each opening 188 may have a diameter between ¼ inch and ½ inch. Screen portion 166 may include closed portion 189 near end cap 184. Closed portion 189 includes no openings 188. Screen 160 may optionally include one or more spacers 190 attached to outer wall 180 for positioning screen 160 within a screen chamber. Spacers 190 may be distributed across the length of screen portion 166. For example, spacers 190 may be located at or near a first end, a middle section, and a second end of screen portion 166. Screen 160 may include between 1 and 5 spacers 190. Alternatively, screen 160 may include no spacers 190.

Figure 9:
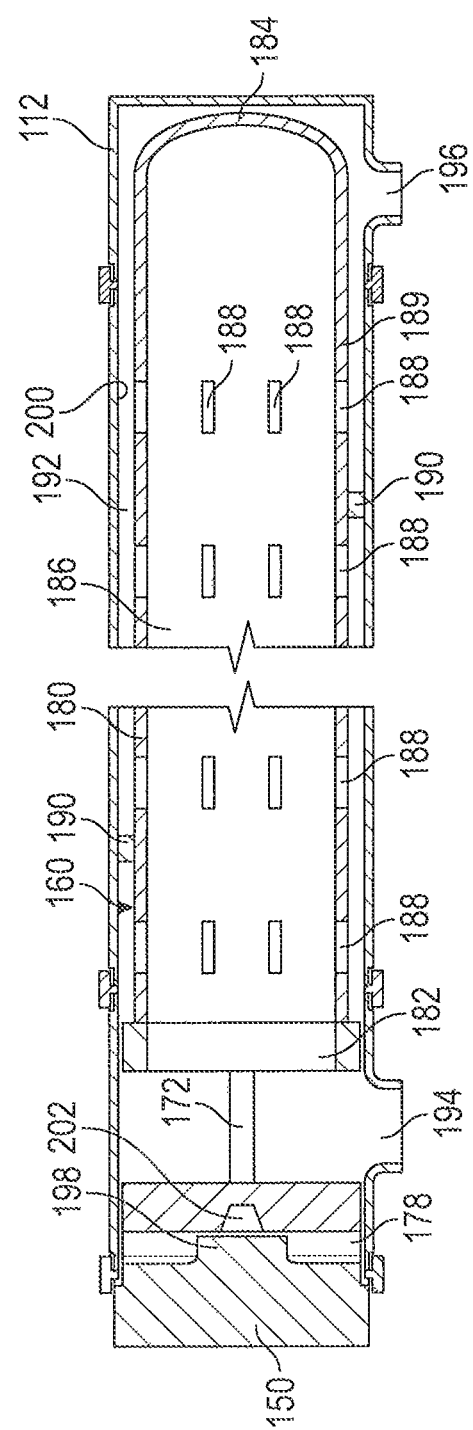
FIG. 9 is a cross-sectional view of a screen positioned within a screen chamber of the screen manifold taken from line A-A in FIG. 2.

With reference to FIG. 9, screen 160 may be removably positioned within inner cavity 192 of first screen chamber 112. Frame portion 162 may be positioned near inlet 194 of screen chamber 112, and end cap 184 may be positioned near outlet 196 of screen chamber 112. In one embodiment, notch 178 of the screen's end block 170 may be operatively coupled with key 198 of the screen chamber's removable end cover 150. Key 198 may engage notch 178 in a mating engagement such that rotation of removable end cover 150 rotates screen 160. In this way, removable end cover 150 may be used to rotationally orient screen 160 within inner cavity 192 of screen chamber 112. In one embodiment, screen 160 may be rotationally oriented within screen chamber 112 such that a plane through frame members 172 and 174 is perpendicular to inlet 194. In this way, fluid flow may be maximized by allowing fluid flowing through inlet 194 to flow through eye 176 without either frame member 172 or 174 obstructing the flow. Other embodiments may utilize alternate rotational positions of screen 160 within screen chamber 112.

Spacers 190 may be configured to engage inner wall 200 of screen chamber 112 to evenly position screen 160 within inner cavity 192. In other words, spacers 190 provide support in the annular space between outer wall 180 of screen 160 and inner wall 200 of screen chamber 112. For example, spacers 190 may provide an effective outside diameter that is substantially equal to or insubstantially less than the inside diameter of screen chamber 112. When removable end cover 150 is disconnected, removable handle 179 (shown in FIG. 6) may be attached to end block 170 of screen 160. For example, removable handle 179 may engage receptacle 202.

Referring still to FIG. 9, a fluid including a liquid component and a solid component may be filtered through screen 160 and screen chamber 112. The fluid may enter inlet 194 of screen chamber 112, and flow through inlet 182 and into interior space 186 of screen 160. All or a portion of the solid component may be trapped within interior space 186 and the liquid component (with or without a portion of the solid component) may be allowed to flow through openings 188. The solid component may be forced into closed portion 189 by a continued fluid flow. In this way, closed portion 189 and end cap 184 of screen 160 may collect a solid component filtered out of a fluid. The filtered fluid (i.e., the liquid component with or without a smaller portion of the solid component) that flows through openings 188 may flow into the annular space between outer wall 180 of screen 160 and inner wall 200 of screen chamber 112. The filtered fluid may exit screen chamber 112 through outlet 196.

First parallel screen chamber 128, second screen chamber 118, and second parallel screen chamber 136 may each include the same described features as screen chamber 112. In the same way as described above, screen 160 may be removably positioned within first parallel screen chamber 128, second screen chamber 118, and second parallel screen chamber 136.

Figure 10:
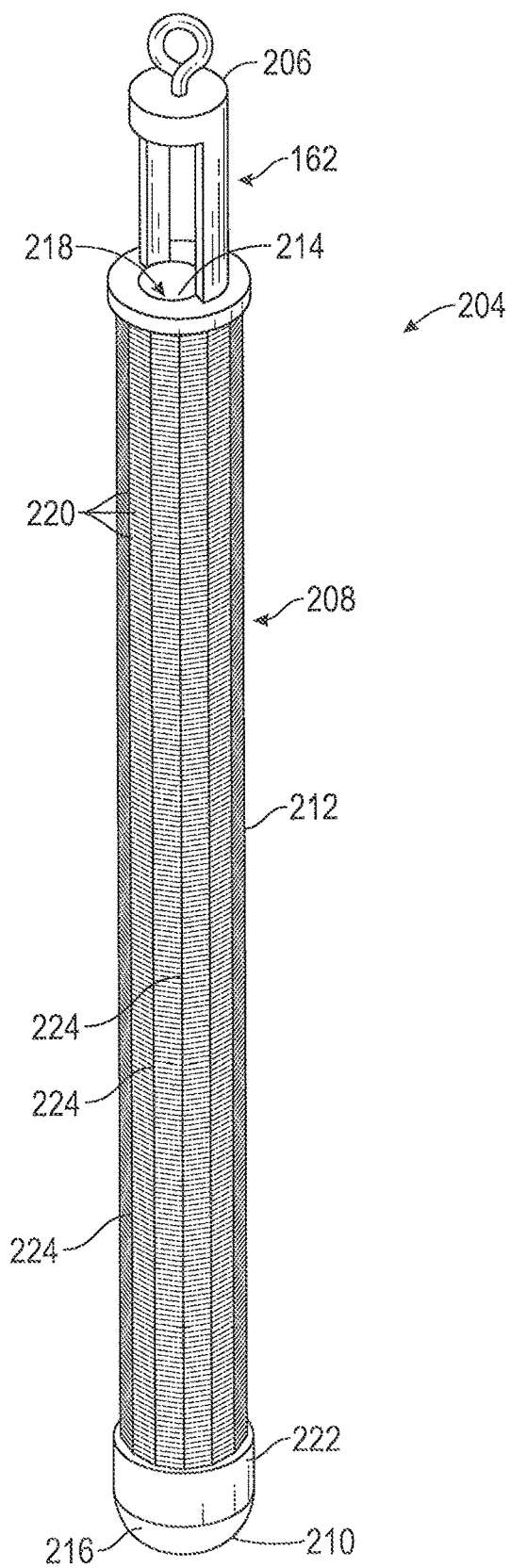
FIG. 10 is a perspective view of an alternate screen of the screen manifold.

FIG. 10 illustrates another embodiment of a screen that is removably positioned within screen chambers 112, 128, 118, and/or 136 of screen manifold 100. Screen 204 includes frame portion 162 at first end 206 and screen portion 208 extending from frame portion 162 to second end 210. Frame portion 162 of screen 204 may include the same features as frame portion 162 of screen 160. Screen portion 208 may include outer wall 212 extending from inlet 214 to end cap 216. End cap 216 is disposed at second end 210 of screen 204. End cap 216 may be fixed or removably attached to the remainder of screen 204. Outer wall 212 may be formed of a hollow longitudinal member including interior space 218. Screen portion 208 may further include a plurality of openings 220 in outer wall 212. Openings 220 may be formed of narrow holes or slots each having a width or diameter of less than ¼ inch, and preferably less than ⅛ inches. Screen portion 208 may include closed portion 222 near end cap 216. Closed portion 222 includes no openings 220. Outer wall 212 may be formed of a plurality of lateral members separated by a distance to form openings or slots 220, along with a plurality of internal longitudinal ridges interconnecting the plurality of lateral members. Longitudinal ridges 224 may be positioned adjacent to interior space 218 to enhance fluid screening.

In other embodiments, screen manifold 100 may include a screen assembly that is removably positioned within screen chambers 112, 128, 118, and/or 136 of screen manifold 100. The screen assembly may include two or more screens concentrically arranged such that an inner screen is disposed within an interior space of an outer screen. The inner screen and the outer screen may each include openings for filtering a fluid from a wellbore.

Figure 11:
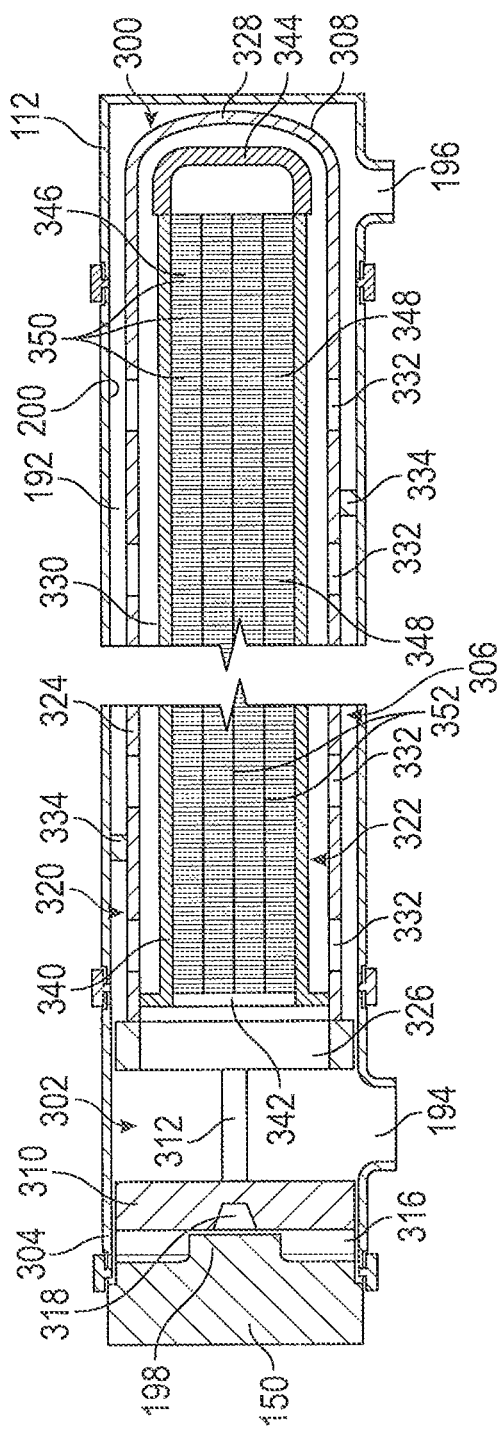
FIG. 11 is a cross-sectional view of a screen assembly for the screen manifold.
Figure 12:
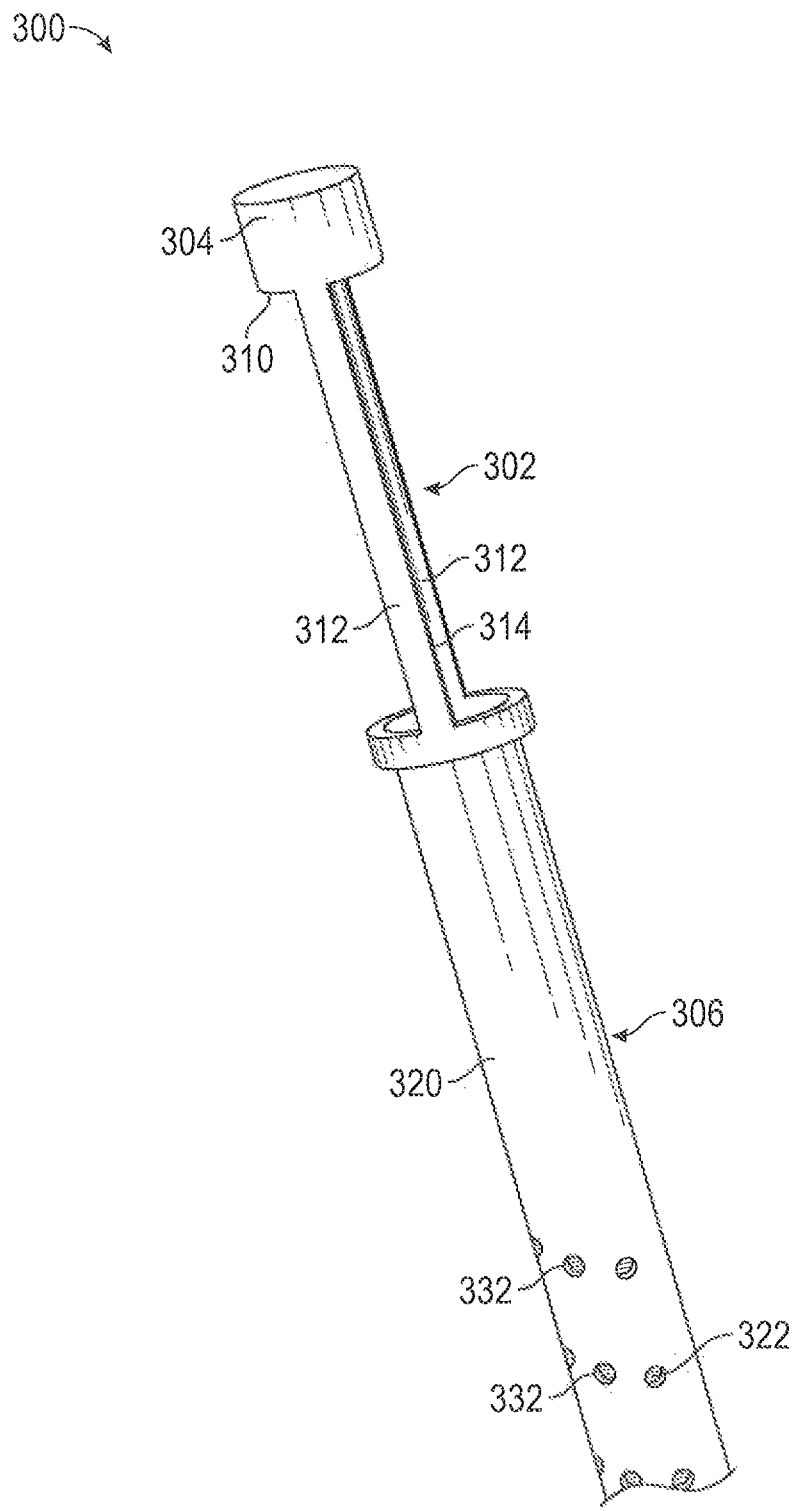
FIG. 12 is a partial perspective view of the screen assembly shown in FIG. 11.

FIGS. 11 and 12 illustrate screen assembly 300 removably positioned within inner cavity 192 of first screen chamber 112. Screen assembly 300 may include frame portion 302 at first end 304 and screen portion 306 extending from frame portion 302 to second end 308. Frame portion 302 may include the same components and features as frame portion 162 of screen 160. For example, frame portion 302 of screen assembly 300 may include end block 310 at first end 304 and frame members 312 interconnecting end block 310 and screen portion 306. Frame members 312 may define aperture 314 (shown in FIG. 12). End block 310 may include notch 316 configured to engage key 198 of removable end cover 150 for rotational alignment of screen assembly 300 within inner cavity 192 of first screen chamber 112. For example, screen assembly 300 may be oriented such that a plane through frame members 312 is perpendicular to inlet 194 of first screen chamber 112. End block 310 may further include receptacle 318 configured to engage a removable handle. Second end 308 may be positioned near outlet 196 of screen chamber 112.

Screen portion 306 of screen assembly 300 may include outer screen 320 and inner screen 322. In this embodiment, outer screen 320 may be fixedly attached to frame portion 302, and inner screen 322 may be fixedly attached to outer screen 320. Outer screen 320 may include outer wall 324 extending from inlet 326 to end cap 328. End cap 328 is disposed at second end 308 of screen assembly 300. Similar to screen 160, outer wall 324 of outer screen 320 may be formed of a hollow longitudinal member including interior space 330. Outer screen 320 may include a plurality of openings 332 through outer wall 324. Each opening 332 may have a diameter between ¼ inch and ½ inch. Screen portion 306 may further include one or more spacers 334 attached to outer wall 324 of outer screen 320 for positioning screen portion 306 within inner cavity 192 of first screen chamber 112.

Inner screen 322 is disposed within interior space 330 of outer screen 320. Inner screen 322 of screen portion 306 may include outer wall 340 extending from inlet 342 to end cap 344. End cap 344 is disposed at second end 308 of screen assembly 300. Similar to screen 204, outer wall 340 of inner screen 322 may be formed of a hollow longitudinal member including interior space 346. Inner screen 322 may include a plurality of openings 348 through outer wall 340. Openings 348 may be formed of narrow holes or slots each having a width or diameter of less than ¼ inch, and preferably less than ⅛ inch. Outer wall 340 of inner screen 322 may be formed of a plurality of lateral members 350 separated by a distance to form openings or slots 348, along with a plurality of internal longitudinal ridges 352 interconnecting the plurality of lateral members 350. Longitudinal ridges 352 may be positioned adjacent to interior space 346 to enhance fluid screening. Openings 348 of inner screen 322 may be smaller than openings 332 of outer screen 320. Screen portion 306 may further include one or more spacers attached to outer wall 340 of inner screen 322 for positioning inner screen 322 within interior space 330 of outer screen 320.

Referring still to FIGS. 11 and 12, a fluid including a liquid component and a solid component may be filtered through screen assembly 300 and screen chamber 112. The fluid may enter through inlet 194 of screen chamber 112, and flow through inlet 326 of outer screen 320, through inlet 342 of inner screen 322, and into interior space 346 of inner screen 322. All or a portion of the solid component may be trapped within interior space 346 and the liquid component (with or without a portion of the solid component) may be flow through openings 348 of inner screen 322 and into an annular space between outer wall 340 of inner screen 322 and outer wall 324 of outer screen 320. Because openings 348 of inner screen 322 are smaller than openings 332 of outer screen 320, any solid component in the annular space will flow with the liquid component through openings 332 of outer screen 320 into an annular space between outer wall 324 of outer screen 320 and inner wall 200 of screen chamber 112. The filtered fluid may exit through outlet 196. The separated solid component may be retained and collected within interior space 346 of inner screen 322.

Figure 13:
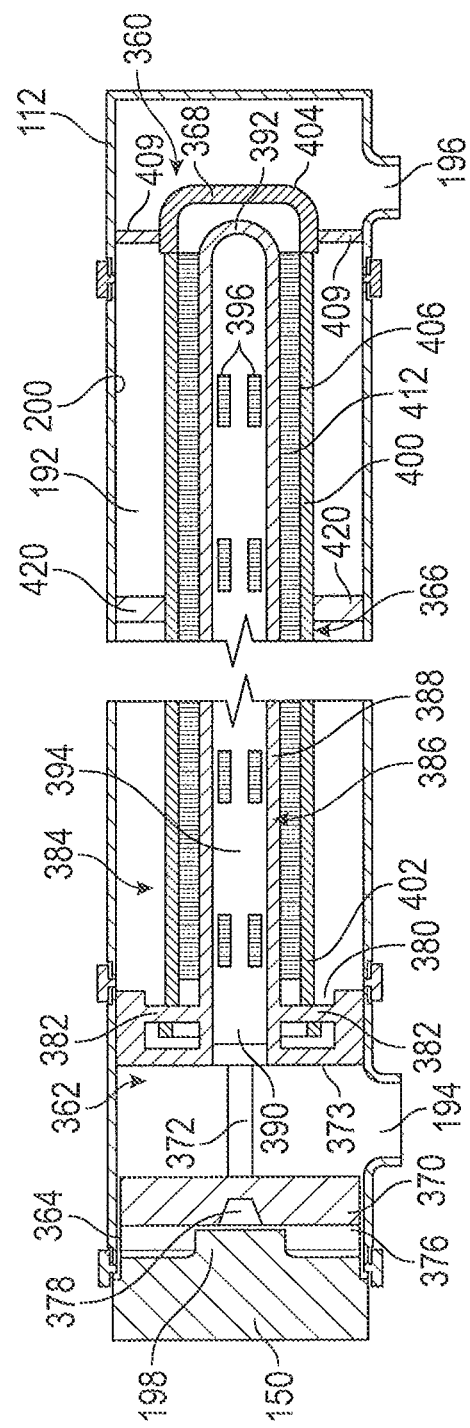
FIG. 13 is a cross-sectional view of an alternate screen assembly for the screen manifold.
Figure 14:
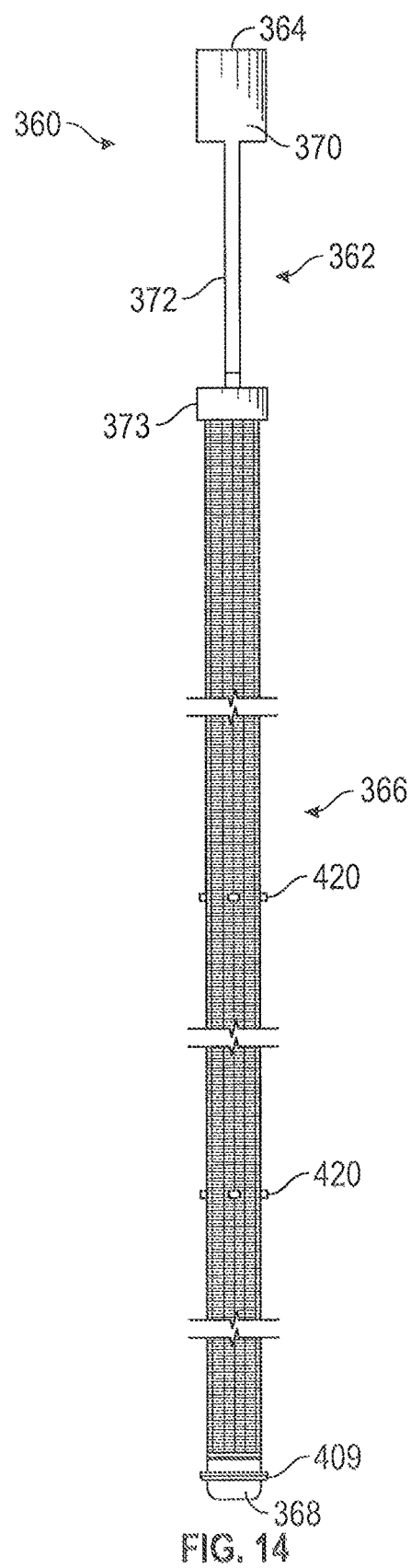
FIG. 14 is a side view of the alternate screen assembly shown in FIG. 13.
Figure 15:
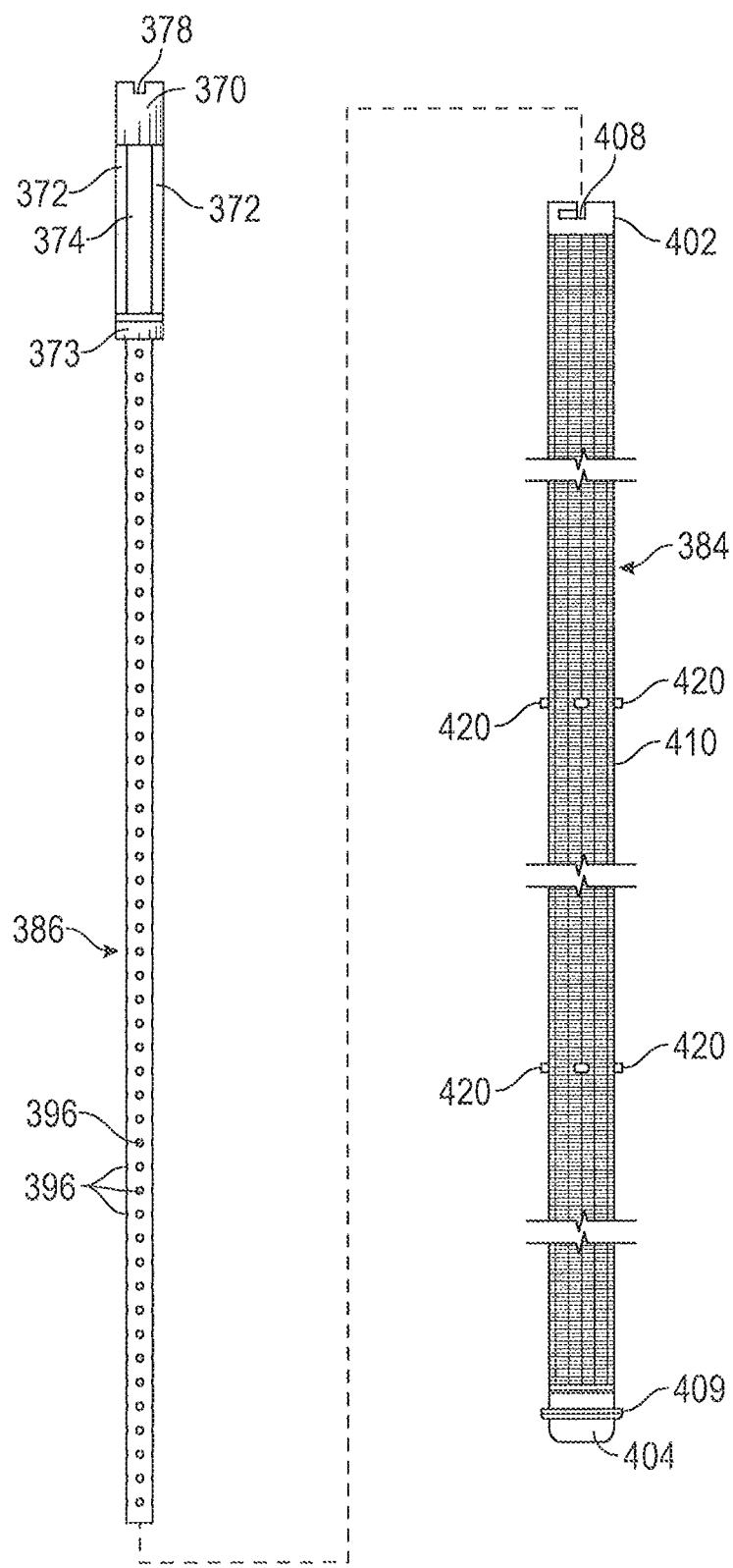
FIG. 15 is an exploded side view of the alternate screen assembly shown in FIGS. 13 and 14.

In an alternate embodiment illustrated in FIGS. 13-15, screen assembly 360 may be removably positioned within inner cavity 192 of first screen chamber 112. Screen assembly 360 may include frame portion 362 at first end 364 and screen portion 366 extending from frame portion 362 to second end 368. Except as otherwise noted, frame portion 362 may include the same components and features as frame portion 162 of screen 160 and frame portion 302 of screen assembly 300. For example, frame portion 362 of screen assembly 360 may include end block 370 at first end 364 and frame members 372 interconnecting end block 370 and screen block 373. Frame members 372 may define aperture 374 (shown in FIG. 15). End block 370 may include notch 376 configured to engage key 198 of removable end cover 150 for rotational alignment of screen assembly 360 within inner cavity 192 of first screen chamber 112. For example, screen assembly 360 may be oriented such that a plane through frame members 372 is perpendicular to inlet 194 of first screen chamber 112. End block 370 may further include receptacle 378 configured to engage a removable handle. Screen block 373 may include receptacle 380 positioned adjacent to screen portion 366 and one or more locks 382 disposed within receptacle 380. Second end 368 may be positioned near outlet 196 of screen chamber 112.

Screen portion 366 of screen assembly 360 may include outer screen 384 and inner screen 386. In this embodiment, inner screen 386 may be fixedly attached to frame portion 362, and outer screen 384 may be removably connected to frame portion 362. Inner screen 386 may include outer wall 388 extending from inlet 390 to end cap 392. End cap 392 is disposed at second end 368 of screen assembly 360. Similar to screen 160, outer wall 388 of inner screen 386 may be formed of a hollow longitudinal member including interior space 394. Inner screen 386 may include a plurality of openings 396 through outer wall 388. Each opening 396 may have a diameter between ¼ inch and ½ inch. In one embodiment, outer wall 388 of inner screen 386 is integrally formed with screen block 373 of frame portion 362. Alternatively, outer wall 388 of inner screen 386 is fixedly attached to screen block 373 of frame portion 362, such as through welding or comparable fixation methods.

Outer screen 384 of screen portion 306 may include outer wall 400 extending from connection portion 402 to end cap 404. Similar to screen 204, outer wall 340 of inner screen 322 may be formed of a hollow longitudinal member including interior space 406. Connection portion 402 may be dimensioned to be received within receptacle 380 of screen block 373. Connection portion 402 may include one or more lock receptacles 408 each configured to engage one of locks 382 of screen block 373 for removably connecting outer screen 384 to frame portion 362. Lock receptacles 408 may be formed of a groove, such as a "J" shaped groove. End cap 404 is disposed at second end 368 of screen assembly 360. End cap 404 may include spacer ring 409 for positioning screen assembly 360 within inner cavity 192 of screen chamber 112. Outer wall 400 of outer screen 384 may further include filter section 410 between connection portion 402 and end cap 404. Filter section 410 may include a plurality of openings 412 through outer wall 400. Openings 412 may be formed of narrow holes or slots each having a width or diameter of less than ¼ inch, and preferably less than ⅛ inch. As described above in connection with screen 204, filter section 410 of outer screen 384 may be formed of a plurality of lateral members separated by a distance to form openings or slots 412, along with a plurality of internal longitudinal ridges interconnecting the plurality of lateral members. Longitudinal ridges may be positioned adjacent to interior space 406 to enhance fluid screening. Screen portion 366 may further include one or more spacers 420 attached to outer wall 400 of outer screen 384 for positioning screen portion 366 within inner cavity 192 of first screen chamber 112.

In this embodiment, inner screen 386 is disposed within interior space 406 of outer screen 384. Openings 396 of inner screen 386 are larger than openings 412 of outer screen 384.

Referring still to FIGS. 13-15, a fluid including a liquid component and a solid component may be filtered through screen assembly 360 and screen chamber 112. The fluid may enter through inlet 194 of screen chamber 112, and flow through inlet 390 of inner screen 386 and into interior space 394 of inner screen 322. All or a portion of the solid component may be trapped within interior space 394 and the liquid component (with or without a portion of the solid component) may be flow through openings 396 of inner screen 386 and into an annular space between outer wall 388 of inner screen 386 and outer wall 400 of outer screen 384. Because openings 396 of inner screen 386 are larger than openings 412 of outer screen 384, the filtered fluid may be further filtered (i.e., removing another portion of the solid component) as it flows through openings 412 of outer screen 384 and into an annular space between outer wall 400 of outer screen 384 and inner wall 200 of screen chamber 112. The filtered fluid may exit through outlet 196. The separated solid components may be retained and collected within interior space 394 of inner screen 386 and within the annular space between inner screen 386 and outer wall 400 of outer screen 384. The solid components retained within inner screen 386 may have a larger size than the solid components retained within outer screen 384. Solid components remaining in the annular space between inner screen 386 and outer wall 400 of outer screen 384 may be removed by disconnecting outer screen 384 from frame portion 362. The disconnection may be accomplished by rotating outer screen 384 to disengage each lock receptacle 408 of outer screen 384 from each lock 382 of frame portion 362.

In certain embodiments of screen assembly 300 and/or 360, the outer screen has an outer diameter between 1.5 inches and 2.0 inches and the inner screen has an outer diameter between 1.0 inches and 1.5 inches. Alternatively, the outer and inner screens of screen assembly 300 and/or 360 may have outer diameters between 0.5 inches and 10 inches.

Screen assembly 300 may be suited to filter debris from a drilling fluid returned from a wellbore, while screen assembly 360 may be better suited for filtering debris from a completion fluid returned from a wellbore.

Screens 160 and 204 and screen assemblies 300 and 360 may be interchangeable. In one embodiment, screens 160 may be installed in all screen chambers of screen manifold 100 to filter completion fluids. In another embodiment, screens 204 may be installed in all screen chambers of screen manifold 100 to filter production fluids. In further embodiments, a combination of screens 160 and 204 may be installed in the screen chambers of screen manifold 100. In other embodiments, screen assembly 300 or screen assembly 360 may be installed in each of the screen chambers of screen manifold 100. In still other embodiments, a combination of screen assemblies 300 or 360 with screens 160 and/or 204 may be installed in the screen chambers of screen manifold 100.

Referring again to FIGS. 1-4, screen manifold 100 may be portable so that it may be transported to a hydrocarbon well for operation at the surface of the well site. Screen manifold may be positioned on portable skid 230. Skid 230 may include floor support 232 and interconnected side frames 234. Screen manifold 100 may be secured to skid 230 via a series of attachment supports 236. Floor support 232 may include receptacles 238 so that skid 230 with affixed manifold 100 may be transported via a fork lift.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

We claim:

1. An apparatus for filtering a fluid from a wellbore comprising:
   a filtering screen assembly including:
      a frame portion at a first end, the frame portion including an end block and two or more frame members extending from the end block, the two or more frame members defining an aperture; and
      a screen portion extending from the frame portion to a second end, the screen portion including an outer screen and an inner screen, the outer screen and the inner screen each including an outer wall defining an interior space and extending from the frame portion to an end cap at the second end, wherein the outer wall of the outer screen and the outer wall of the inner screen each includes a plurality of openings therethrough through which filtered fluid flows, wherein the inner screen is disposed within the interior space of the outer screen, and wherein the inner screen includes a fluid inlet proximate the frame portion; and
   a screen chamber comprising an inner cavity and a removable end cover, wherein the filtering screen assembly is removably positioned within the inner cavity, and wherein the screen chamber is configured to allow removal or installation of the filtering screen assembly when the removable end cover is removed; wherein the screen chamber includes an inlet for fluid to be filtered and an outlet for filtered fluids.

2. The apparatus of claim 1, wherein the inner screen is fixedly attached within the interior space of the outer screen, and wherein the outer screen is fixedly attached to the frame portion.

3. The apparatus of claim 1, wherein the inner screen is fixedly attached to the frame portion, and wherein the outer screen is removably connected to the frame portion.

4. The apparatus of claim 3, wherein the frame portion includes a lock and the outer screen includes a lock receptacle dimensioned to engage the lock of the frame portion to removably attach the outer screen to the frame portion.

5. The apparatus of claim 1, further comprising a spacer between the outer wall of the inner screen and the outer wall of the outer screen for aligning the inner screen within the interior space of the outer screen, and further comprising a spacer affixed to the outer wall of the outer screen for aligning the filtering screen assembly within the inner cavity of the screen chamber.

6. The apparatus of claim 1, further comprising a removable handle configured to attach to the end block of the frame portion for removal of the filtering screen assembly from the screen chamber when the removable end cover is removed.

7. The apparatus of claim 1, wherein the removable end cover of the screen chamber further includes a key configured to engage a reciprocal notch in the end block of the frame portion of the filtering screen assembly to rotationally orient the filtering screen assembly within the screen chamber.

8. An apparatus for filtering a fluid from a wellbore, comprising:
  a fluid inlet and a fluid outlet;
  a first fluid path extending from the fluid inlet through a first screen chamber to the fluid outlet, the first screen chamber including an inner cavity, wherein the first fluid path includes a first inlet valve between the fluid inlet and the first screen chamber;
  a first screen assembly removably positioned within the inner cavity of the first screen chamber, the first screen assembly including a frame portion at a first end and a screen portion extending from the frame portion to a second end; the frame portion including an end block and two or more frame members extending from the end block to the screen portion, the two or more frame members defining an aperture; the screen portion including an outer screen and an inner screen each including an outer wall defining an interior space, wherein the outer wall of the outer screen and the outer wall of the inner screen each includes a plurality of openings therethrough through which filtered fluid flows, wherein the inner screen is disposed within the interior space of the outer screen; wherein the first fluid path extends through the aperture of the frame portion, the interior space of the inner screen, the plurality of openings of the inner screen, and the plurality of openings of the outer screen;
  a bypass fluid path extending from the fluid inlet to the fluid outlet, wherein the bypass fluid path includes a bypass valve between the fluid inlet and the fluid outlet;
  wherein in a default arrangement the first inlet valve is open and the bypass valve is closed for filtering a fluid through the first screen assembly, and wherein in a bypass arrangement the first inlet valve is closed and the bypass valve is open whereby fluid flow through the first screen assembly is bypassed but permits continued flow of the fluid through the apparatus during maintenance of the first screen assembly.

9. The apparatus of claim 8, wherein the inner screen of the first screen assembly is fixedly attached within the interior space of the outer screen, and wherein the outer screen is fixedly attached to the frame portion.

10. The apparatus of claim 8, wherein the inner screen of the first screen assembly is fixedly attached to the frame portion, and wherein the outer screen is removably connected to the frame portion.

11. The apparatus of claim 10, wherein the frame portion of the first screen assembly includes a lock and the outer screen comprises a lock receptacle dimensioned to engage the lock of the frame portion to removably attach the outer screen to the frame portion.

12. The apparatus of claim 8, wherein the first screen chamber further includes a removable end cover.

13. The apparatus of claim 12, wherein the removable end cover of the first screen chamber further includes a key configured to engage a reciprocal notch in the end block of the first screen assembly to rotationally orient the first screen assembly within the first screen chamber.

14. The apparatus of claim 13, wherein the first screen assembly further includes a removable handle configured to attach to the end block for removal of the first screen assembly from the first screen chamber when the removable end cover is removed.

15. The apparatus of claim 8, wherein the first screen assembly further include a spacer affixed to the outer wall of the outer screen of the screen portion, wherein the spacer is configured to engage an inner wall of the first screen chamber for aligning the first screen assembly within the inner cavity of the first screen chamber.

16. The apparatus of claim 8, wherein the first fluid path further includes a first outlet valve between the first screen chamber and the fluid outlet.

17. The apparatus of claim 16, further comprising a first parallel fluid path extending from an inlet through a first parallel screen chamber and a first parallel screen assembly to an outlet, the first parallel screen assembly removably positioned within an inner cavity of the first parallel screen chamber, wherein the inlet is fluidly connected to the first fluid path between the first inlet valve and the first screen chamber, and wherein the outlet is fluidly connected to the first fluid path between the first screen chamber and the first outlet valve.

18. The apparatus of claim 8, further comprising a second fluid path extending from the fluid inlet through a second screen chamber and a second screen assembly to the fluid outlet, the second screen assembly removably positioned within an inner cavity of the second screen chamber, wherein the second fluid path includes a second inlet valve between the fluid inlet and the second screen chamber.

19. The apparatus of claim 18, wherein the second fluid path further includes a second outlet valve between the second screen chamber and the fluid outlet.

20. The apparatus of claim 19, further comprising a second parallel fluid path extending from an inlet through a second parallel screen chamber and a second parallel screen assembly to an outlet, the second parallel screen assembly removably disposed within an inner cavity of the second parallel screen chamber, wherein the inlet is fluidly connected to the second fluid path between the second inlet valve and the second screen chamber, and wherein the outlet is fluidly connected to the second fluid path between the second screen chamber and the second outlet.

21. A method of filtering a fluid from a wellbore, comprising the steps of:
  a) providing a filtering apparatus comprising: a fluid inlet and a fluid outlet; a first fluid path extending from the fluid inlet through a first screen chamber to the fluid outlet, the first screen chamber including an inner cavity, wherein the first fluid path includes a first inlet valve between the fluid inlet and the first screen chamber, a first screen assembly removably positioned within the inner cavity of the first screen chamber, the first screen assembly including a frame portion at a first end and a screen portion extending from the frame portion to a second end, the frame portion including an end block and two or more frame members extending from the end block to the screen portion, the two or more frame members defining an aperture, the screen portion including an outer screen and an inner screen each including an outer wall defining an interior space, wherein the outer wall of the outer screen and the outer wall of the inner screen each includes a plurality of openings therethrough through which filtered fluid flows, wherein the inner screen is disposed within the interior space of the outer screen, wherein the first fluid path extends through the aperture of the frame portion, the interior space of the inner screen, the plurality of openings of the inner screen, and the plurality of openings of the outer screen; a bypass fluid path extending from the fluid inlet to the fluid outlet, wherein the bypass fluid path includes a bypass valve between the fluid inlet and the fluid outlet; wherein in a default arrangement the first inlet valve is open and the bypass valve is closed for filtering a fluid through the first screen assembly, and wherein in a bypass arrangement the first inlet valve is closed and the bypass valve is open whereby fluid flow through the first screen assembly is bypassed but permits continued fluid flow through the apparatus during maintenance of the first screen assembly;

b) feeding a fluid from a wellbore through the fluid inlet with the filtering apparatus in the default position, wherein the fluid contains a liquid component and a solid component;

c) flowing the fluid through the first fluid path into the first screen chamber and the first screen assembly;

d) filtering the fluid by allowing the liquid component of the fluid to flow through the openings in the inner and outer screens of the first screen assembly while retaining the solid component of the fluid within the interior space of the inner screen or the interior space of the outer screen; and e) flowing the liquid component of the fluid through the first fluid path to the fluid outlet.

22. The method of claim 21, further comprising the steps of:

f) placing the filtering apparatus in the bypass arrangement; and g) feeding the fluid through the bypass fluid path to the fluid outlet.

23. The method of claim 22, wherein the first screen chamber further includes a removable end cover, and wherein the method further comprises the steps of:

h) removing the removable end cover to access the first screen assembly within the first screen chamber.

24. The method of claim 23, wherein the first screen assembly further includes a receptacle, and wherein the method further comprises the steps of:

i) attaching a handle to the receptacle; and j) removing the first screen assembly from the first screen chamber.

25. The method of claim 24, wherein the inner screen of the first screen assembly is fixedly attached to the frame portion, wherein the outer screen is removably connected to the frame portion, wherein the frame portion includes a lock and the outer screen includes a lock receptacle configured to engage the lock of the frame portion to removably connect the outer screen to the frame portion, the method further comprising the steps of:

k) disengaging the lock receptacle of the outer screen from the lock of the frame portion to disconnect the outer screen from the frame portion and the inner screen of the first screen assembly.

26. The method of claim 23, wherein the removable end cover further includes a key configured to engage a reciprocal notch in the first screen assembly, and wherein the method further comprises the steps of:

i) replacing the removable end cover on the first screen chamber such that the key of the removable end cover engages the notch of the first screen assembly; and j) rotating the removable end cover to rotationally align the first screen assembly within the first screen chamber.

* * * * *